Aug. 5, 1941.                    T. BREWER                    2,251,319
                                CHOKER HOOK
                             Filed June 10, 1940

INVENTOR
THOMAS BREWER
BY
ATTORNEY

Patented Aug. 5, 1941

2,251,319

UNITED STATES PATENT OFFICE 2,251,319

CHOKER HOOK

Thomas Brewer, Kelso, Wash.

Application June 10, 1940, Serial No. 339,727

1 Claim. (Cl. 24—123)

This invention relates generally to the logging industry and particularly to a choker hook.

The main object of my invention is to construct a choker hook especially adapted for use in conjunction with my ferrule described in my co-pending application, Serial No. 318,722.

The second object is to construct a choker hook in which all unnecessary weight is eliminated without in any way detracting from the strength of the hook.

The third object is to construct a hook of the class described which will be easy to produce by the casting process and which will be less apt to become fouled by rocks or branches.

These and other objects are accomplished in the manner set forth in the following specification as illustrated in the accompanying drawing, in which.

Similar numerals refer to similar parts throughout the several views.

Figure 1:
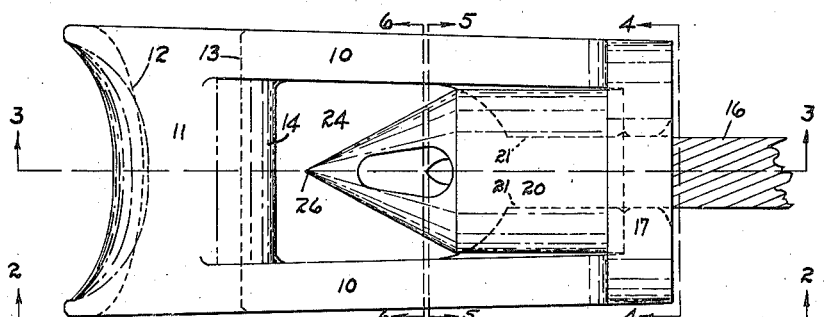
Fig. 1 is a plan of my improved form of choker hook showing the ferrule in position, and taken along the line 1—1 in Fig. 2.
Figure 2:
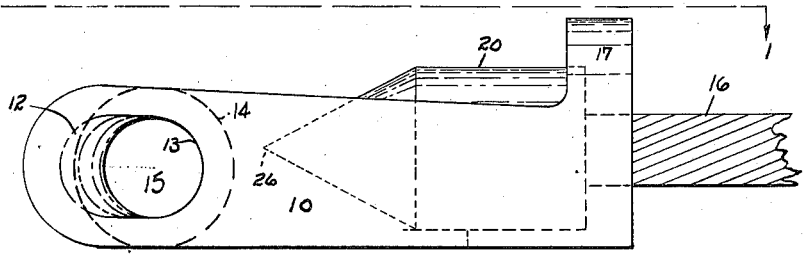
Fig. 2 is a side elevation of the hook showing the ferrule in position and taken along the line 2—2 in Fig. 1.
Figure 3:
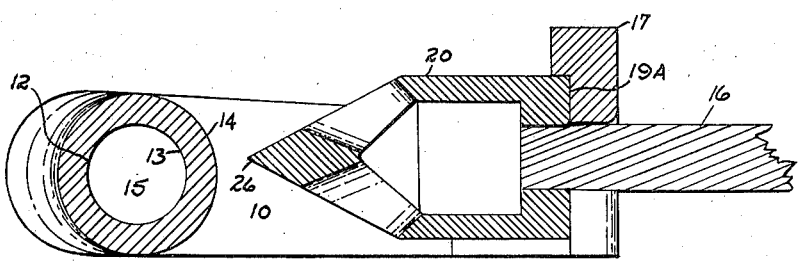
Fig. 3 is a section taken along the line 3—3 in Fig. 1.
Figure 4:
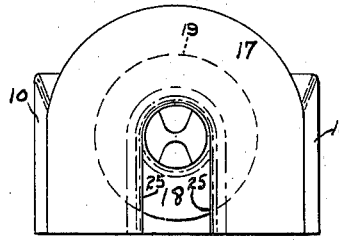
Fig. 4 is an end elevation of Fig. 1 taken along the line 4—4 and showing the choker cable removed therefrom.
Figure 5:
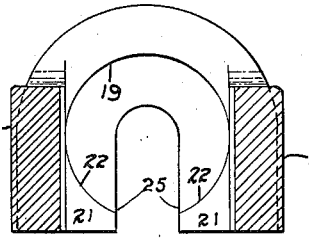
Fig. 5 is a transverse section taken along the line 5—5 in Fig. 1 with the ferrule removed therefrom.
Figure 6:
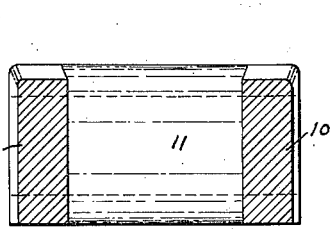
Fig. 6 is a transverse section taken along the line 6—6 in Fig. 1 with the ferrule removed therefrom.
Figure 7:
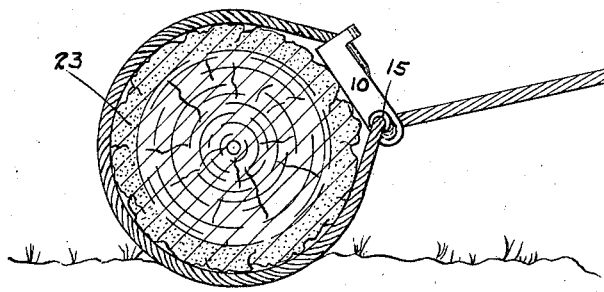
Fig. 7 is a transverse section through a log showing the manner in which the choker hook in employed.

Referring in detail to the drawing there is shown a pair of spaced side members 10 joined at one end by a tubular cross member 11 whose outer side 12 is somewhat convex and whose inner side 13 is preferably straight as indicated, although not necessarily so. The outer surface 14 is rounded as shown to reduce the weight and provide uniform cross section to the various portions of the casting.

The opening 15 is large enough to freely receive the choker cable 16.

The members 10 are joined at their opposite ends by the arched base 17 having a slot 18 formed therein which is also adapted to freely receive the choker cable 16. It will be understood that the base 17 is integral with the sides 10. A circular depression 19 is formed in the base 19 and forms a seat 19—A for the pointed ferrule 20 which is securely fastened on the end of the cable 16. Projecting inwardly from the sides 10 are the ears 21 whose arcuate edges 22 conform with the curvature of the depression 19.

In the operation of this device, the cable 16 is always within the opening 15 and when it is desired to attach the cable 16 to a log 23, the pointed ferrule 20 is simply passed around the log 23 and inserted into the opening 24 between the sides 10 and the end 11 and the cable is then permitted to pass between the sides 25 of the slot 18 and any pull which is exerted upon the cable 16 will cause the ferrule 20 to occupy the seat 19—A and prevent the escape of the ferrule 20 from the choker hook itself.

In actual construction, the point 26 of the ferrule 20 barely clears the rounded edge 14. In this case the space has been exaggerated for the purpose of illustration only.

It is understood that choker hooks of this general type have long been in use and are illustrated in the patents of Buckley, 1,391,457; Wirkkala, 1,464,161; Stewart, 1,615,528; Bardon, 1,651,081; and Spiering, 1,666,262. It is therefore not my intention to cover such devices broadly but I do intend to cover all such forms and modifications thereof as fall fairly within the appended claim.

I claim:

A choker hook of the class described consisting of a pair of substantially parallel side members held in spaced relation to each other by means of a tubular tie across one end thereof and a slotted base across the opposite end thereof, the innermost side of said base having a ferrule seating recess formed therein, a choker ferrule associated with said hook characterized by having a pointed end opposite its cable end, said ferrule being adapted to pass freely between said side members and to have its cable pass freely through the slot in said base and to have its pointed end pass freely under the tubular tie member.

THOMAS BREWER.